(12) United States Patent  
Kuster

(10) Patent No.: US 9,921,237 B2  
(45) Date of Patent: Mar. 20, 2018

(54) VEHICLE WHEEL SPEED DETECTION SYSTEM AND METHOD

(71) Applicant: WABCO GmbH, Hannover (DE)

(72) Inventor: Klaus Kuster, Hannover (DE)

(73) Assignee: WABCO GmbH, Hannover (DE)

(*) Notice: Subject to any disclaimer, the term of this patent is extended or adjusted under 35 U.S.C. 154(b) by 59 days.

(21) Appl. No.: 14/896,545

(22) PCT Filed: May 24, 2014

(86) PCT No.: PCT/EP2014/001408  
§ 371 (c)(1),  
(2) Date: Dec. 7, 2015

(87) PCT Pub. No.: WO2014/206516  
PCT Pub. Date: Dec. 31, 2014

(65) Prior Publication Data  
US 2016/0146847 A1    May 26, 2016

(30) Foreign Application Priority Data  
Jun. 29, 2013    (DE) .................. 10 2013 010 925

(51) Int. Cl.  
*G01P 3/488* (2006.01)  
*G01P 1/02* (2006.01)  
(Continued)

(52) U.S. Cl.  
CPC .............. *G01P 3/488* (2013.01); *G01P 1/026* (2013.01); *G01P 3/487* (2013.01); *G01D 11/245* (2013.01)

(58) Field of Classification Search  
CPC ........ G04C 5/00; H02K 49/102; G01D 5/142; G01D 5/145; G01D 5/2033; G01D 5/2241;  
(Continued)

(56) References Cited

U.S. PATENT DOCUMENTS

| 6,452,383 B1* | 9/2002 | Goedecke ................. G01P 1/00 |
| | | 310/156.12 |
| 2009/0134866 A1* | 5/2009 | Tsuda ................... G01D 11/245 |
| | | 324/207.25 |

(Continued)

FOREIGN PATENT DOCUMENTS

| DE | 32 15 212 A1 | 11/1983 |
| DE | 39 19 109 A1 | 12/1990 |

(Continued)

*Primary Examiner* — Tung X Nguyen  
*Assistant Examiner* — Robert P Alejnikov, Jr.  
(74) *Attorney, Agent, or Firm* — Warner Norcross & Judd LLP

(57) ABSTRACT

A sensor apparatus for detecting a wheel speed of a vehicle has a rod-shaped sensor carrier and a sensor, which is introduced into the sensor carrier and, in order to detect the wheel speed, senses the rotation of a rotor rotating together with the wheel. The sensor apparatus has a carrier structure for accommodating the sensor and a potting compound for filling the sensor carrier. The surface, in particular the lateral surface, of the sensor carrier is formed by a plurality of interrupted, metal surface areas of the carrier structure and areas filled with the potting compound, wherein at least two metal surface areas are in the form of contact surfaces.

13 Claims, 3 Drawing Sheets

(51) Int. Cl.
 *G01P 3/487* (2006.01)
 *G01D 11/24* (2006.01)

(58) Field of Classification Search
 CPC ..... G01C 15/14; G01J 1/4228; G01B 5/0011;
  G01B 9/02058; G01B 7/00; G01B 7/14;
  G01B 7/30; G01B 7/287; G01B 7/312;
  G01B 7/315; G01R 33/02
 USPC ............ 324/207.25, 207.11–207.14, 765.01,
  324/764.01, 545–546, 76.11, 142;
  702/150
 See application file for complete search history.

(56) References Cited

U.S. PATENT DOCUMENTS

2011/0023265 A1* 2/2011 Singbartl ................ B60T 8/329
  16/2.1
2013/0160669 A1* 6/2013 Turmeau .................. B61F 5/28
  105/218.1

FOREIGN PATENT DOCUMENTS

| DE | 691 03 118 T2 | 4/1992 | |
|---|---|---|---|
| DE | 197 58 075 A1 | 2/1999 | |
| DE | 10 2007 008 744 A1 | 9/2007 | |
| DE | 10 2007 056 340 A1 | 5/2009 | |
| DE | 10 2008 064 047 A1 | 4/2010 | |
| DE | 2211396 A2 * | 7/2010 | ........... G01D 11/245 |
| EP | 2 211 396 B1 | 7/2010 | |
| EP | 2 322 811 A1 | 5/2011 | |

* cited by examiner

VEHICLE WHEEL SPEED DETECTION SYSTEM AND METHOD

FIELD OF THE INVENTION

The present invention generally relates to sensor devices for detecting vehicle wheel speeds, especially for commercial vehicles.

BACKGROUND OF THE INVENTION

A known sensor device is described in Applicant's DE 32 15 212 A1, for example. The sensor device is in the shape of a rod, which is conventional, and comprises a sensor in the sensor head, the sensor being designed to detect the rotational movement of a rotor. For this purpose, this known sensor device is clamped in a retaining opening disposed in the region of the wheel by a separate clamping bush. The retaining opening is a hole or a bore, into which the clamping bush is slid.

The sensor device is installed by sliding the sensor device into the clamping bush up to the point of contact with the rotor and the sensor device being retained in the clamping bush by frictional force. The sensor device is axially displaceable in the clamping bush, however, protecting against damage to the sensor device during contra-rotation of the rotor, while nevertheless retaining the device in the clamping bush.

The known rod sensor is typically cylindrical and has a closed lateral surface. The sensor for detecting the wheel speed is retained in the interior of the lateral surface by a potting compound.

Elevated radiant heat is carried to the sensor within the sensor installation space, in particular during and after braking. This radiant heat can occur briefly or can persist for a relatively long time. Such temperature fluctuations can unfavorably affect the retaining forces of the rod sensor within the clamping bush such that the sensor device can migrate within the clamping bush, whereby the air gap between the sensor head and the rotor can increase, which is undesirable.

Furthermore, such sensor devices are mass-produced. It is desirable to minimize production costs.

SUMMARY OF THE INVENTION

Generally speaking, it is an object of the present invention to provide an improved sensor device that is cost-effective to produce.

According to embodiments of the present invention, the sensor device, which detects a wheel speed of a vehicle, comprises a rod-shaped sensor carrier and a sensor, which is introduced into the sensor carrier. In order to detect the wheel speed, the sensor senses or samples the rotation of a rotor rotating together with the wheel.

According to an embodiment, the sensor carrier advantageously includes a support structure made from a non-ferromagnetic metal. Moreover, the support structure accommodates the sensor and therefore advantageously makes it possible to position the sensor precisely within the sensor device.

In addition, in one embodiment, the support structure of the sensor carrier is filled with a potting compound, for example a plastic.

Furthermore, the sensor carrier according to an embodiment of the present invention has a lateral surface, which has a plurality of interrupted metal surface areas of the support structure and has areas filled with the potting compound.

The inventive sensor device can be clamped in a conventional clamping bush. For this purpose, the clamping bush comprises resilient tongues, which contact the inserted sensor device and press the device onto respectively opposite tongues. The resulting clamping forces are dimensioned such that, on the one hand, the sensor device is retained in its position despite mechanical vibrations, impacts, and other disturbing forces and, on the other hand, axial displacement of the sensor device is possible during contra-rotation of the rotor without damaging the sensor device.

One possible embodiment of a conventional clamping bush is shown in Applicant's DE 10 2007 056 340 A1. It should be appreciated, however, that any suitable structure that can clamp the sensor device in a retaining opening and retain it in an axially displaceable manner, is contemplated.

In order to continue using available clamping bushes having clamping elements designed as resilient tongues for the installation of the sensor device, the support structure of the sensor carrier can have at least two contact surface areas. The number of contact surfaces and the dimensions of the contact surfaces depend on the clamping bush to be used and on the arrangement and number of resilient tongues within the clamping bush. The contact surfaces are preferably distributed such that the resilient tongues of the clamping bush press onto the contact surfaces of the sensor carrier.

Because the contact surfaces are individual surface areas, which are largely separated from one another, better retention of the sensor device within the clamping bush is achieved, since the contact surfaces are slightly yielding. Furthermore, the interrupted surface of the support structure provides favorable temperature properties and, therefore, greater stability in the clamping bush.

The sensor device according to embodiments of the present invention can be matched to existing systems in terms of size and configuration and, advantageously, can replace existing sensor devices.

According to an embodiment of the present invention, the support structure of the sensor device has a guide projection for the oriented insertion of the sensor device into the clamping bush.

A conventional clamping bush has the shape of a slotted sleeve in order to compensate for minor production tolerances of the a retaining opening and in order to achieve a sufficient clamping effect within the retaining opening. To install the sensor device according to embodiments of the present invention, the device is inserted into the clamping bush such that the guide projection extends within the slot of the clamping bush. The available guide projection effectuates a predefined orientation of the sensor device in the clamping bush, whereby the correct seating of the contact surfaces on the resilient tongues of the clamping bush is advantageously ensured. Therefore, the sensor device can be easily installed correctly.

In another embodiment, the support structure is formed as a stamped and bent part from a carrier strip. Since the sensor device is preferably mass-produced, low-cost production of the support structure in the form of a stamped screen is advantageous. The stamped screen can be produced from a metal sheet by a stamping and bending machine.

In a further embodiment, at least two stabilizers are provided within the support structure transversely to the longitudinal direction of the sensor carrier. These stabilizers are disposed between the contact surfaces and advantageously provide a constant pressure between the contact surfaces and the resilient tongues of the clamping bush, even if the plastic injected within the support structure were to shrink due to aging.

The stabilizers can be introduced separately into the sensor carrier or can be taken into account in the support structure, which is in the form of a stamped screen, during production.

Preferably, the stabilizers are disposed within the sensor carrier such that, in the state in which the sensor device is inserted in the clamping bush, the stabilizers are located at the level of the resilient tongues of the clamping bush.

According to another embodiment of the present invention, the support structure has a sensor supporting surface for attaching the sensor. The sensor supporting surface is provided within the carrier strip and is connected to at least one contact surface via at least two connecting webs. The connecting webs are bent during the production process such that the sensor located on the sensor supporting surface is located, in the radial direction, substantially in the center of the sensor carrier.

Furthermore, each of the connecting webs can have a curved section, e.g., an S-shaped section, in the finally bent state. This curved section has a resilient effect and advantageously ensures that thermal stresses do not occur the region of the sensor.

In another embodiment, the support structure has a front cover surface on the front face of the sensor device, which forms the cover surface of the circular-cylindrical sensor carrier in the bent state of the support structure. This cover surface is directed toward the rotor, whereby the sensor head, due to the metal surface, has a slight abrasive behavior due to contact with the rotor and, advantageously, a relatively long durability of the sensor device is achieved.

Furthermore, the cover surface advantageously serves as a heat shield between the radiant heat of the brakes and the sensor, which is located in the interior of the sensor carrier.

According to another embodiment, the support structure has an attachment surface for attaching at least one connecting able of the sensor. For this purpose, after the sensor is attached on the sensor supporting surface, the connecting cable(s) of the sensor is/are mechanically attached on the attachment surface by plastic deformation of the edges of the attachment surface. This joining process, which is also referred to as crimping, is advantageously rapid, low-cost, and reliable.

In another exemplary embodiment of the present invention, at least one attachment tab is provided on at least one contact surface of the support structure. These attachment tabs are bent in the shape of claws in the bending process of the support structure in order to advantageously achieve better handling when the support structure is filled with potting compound.

According to another embodiment, an active or a passive sensor for detecting the rotation of the rotor is provided as the sensor in the sensor carrier.

Active sensors usually function on the basis of magnetoresistive effects and detect the magnetic field of a rotor rotating with the wheel, wherein the rotor is often in the form of a permanent magnetic ring having an alternating sequence of north and south pole magnetizations. In order to detect the wheel speed, the active sensor is supplied with a defined voltage. The magnetoresistive sensors preferably AMR (anisotropic magnetoresistive sensors or GMR (giant magnetoresistive) sensors.

As an alternative, the active sensor is a Hall sensor or a Hall effect sensor for detecting the rotation of the rotor by means of the Hall effect.

The active sensor is preferably position-independent with respect to rotations about the longitudinal axis, whereby the sensor device can be advantageously clamped in the retaining opening with the clamping bush in any orientation, and time-consuming adjustment work during installation is eliminated.

The use of active sensors for detecting the wheel speed has the advantage that an active sensor also delivers measured values when the rotor rotates very slowly or even stands still.

As an alternative, the sensor device has a passive sensor the passively detecting the rotation of the rotor. For this purpose, the sensor contains a permanent magnet and a coil. By means of the toothing of the rotor, the magnetic flux in the sensor is changed in proportion to the rotational speed and an electrical alternating voltage is generated.

It should be understood that other types of sensors can also be used, however.

A sensor arrangement according to an embodiment of the present invention for detecting a wheel speed of a vehicle comprises a sensor device according to an embodiment of the present invention, which is clamped into a clamping bush. The clamping bush has clamping elements, e.g., resilient tongues, which rest against the contact surfaces of the sensor device and therefore provide a stable fixed retention of the sensor device in the clamping bush.

A wheel speed detection, system according to an embodiment of the present invention comprises at least one sensor device according to an embodiment of the present invention and is preferably used in vehicle driver assistance systems, which require the current wheel speed for control functions and/or regulating functions, such as, for example, antilock braking, adaptive cruise control (ACC), electronic braking, or active rollover protection (ARP).

In addition, the wheel speed detection system comprises a control unit, which takes into account signals or data from the sensor device or sensor devices for open-loop control functions and/or closed-loop control functions within the driver assistance system.

The inventive embodiments have application in a vehicle, especially a commercial vehicle. In particular, the vehicle can be equipped with the sensor device according to embodiments of the present invention and/or the sensor arrangement according to embodiments of the present invention having the inventive sensor device, and/or the wheel speed detection system according to embodiments of the present invention having the inventive sensor device.

In a method for producing a sensor device for detecting a wheel speed according to an embodiment of the present invention, the support structure is first produced from a metal sheet, e.g., by a stamping process. The support structure is preferably stamped out as a single piece in order to simplify mass production.

The connecting cables are attached to the sensor, e.g., by soldering or welding. The method is not limited to the aforementioned sequence, however. The connecting cables can also be attached after the sensor is attached, wherein the first procedure is preferred, because, in a soldering or welding process to attach the connecting cables after the sensor is attached, the adhesive could damage the sensor.

The sensor is placed into the support structure and is attached on the sensor supporting surface of the support structure, wherein the attachment is preferably effected using an adhesive. The attachment of the sensor directly on the support structure advantageously makes it possible to position the sensor precisely within the sensor carrier.

The connecting cable of the sensor is attached on the attachment surface of the support structure. The cables are preferably attached by crimping.

The support structure is bent such that the sensor device is substantially in the shape of a rod. The dimensions of the sensor device are predefined by the clamping bush to be used. The use of a known clamping bush makes it possible to easily and cost-effectively replace conventionally used rod sensors in existing systems with the inventive sensor device.

The support structure is filled with a potting compound, e.g., plastic or synthetic resin, to provide the sensor device with suitable mechanical stability.

According to an embodiment of the present invention, the sensor is coated with another potting compound, e.g., silicone, which surrounds the sensor in a hemispherical shape, for protection before the support structure is bent. This "glob top" process advantageously ensures that the sensor remains untouched by the potting compound that actually fills the sensor carrier. The sensor is thermally protected as a result and retains its position even if the potting compound were to contract or shrink.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below with reference to the appended drawings, in which.

DETAILED DESCRIPTION OF THE PREFERRED EMBODIMENTS

Figure 1:
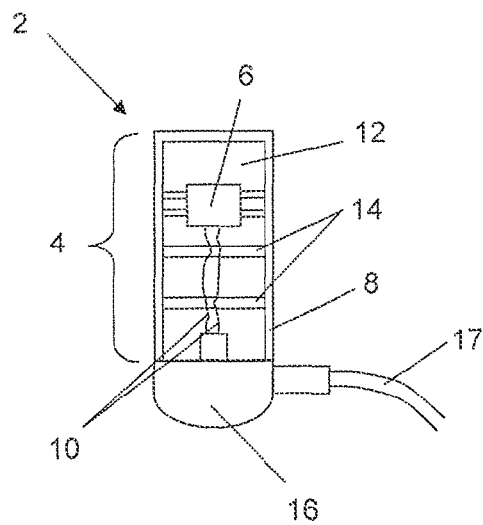
FIG. 1 is a schematic sectional view through a sensor device according to an exemplary embodiment of the present invention.

FIG. 1 shows a sensor device 2 according to an exemplary embodiment of the present invention. The sensor device 2 shown is suitable for detecting the wheel speed on a vehicle and is designed as a rod sensor. The dimensions of the sensor device 2 are matched to the clamping bush used for installation. FIG. 1 shows a sectional view through the longitudinal axis of the sensor device 2.

The sensor device 2 comprises a substantially rod-shaped or circular-cylindrical sensor carrier 4 and a sensor 6, which is introduced into the sensor carrier 4. The sensor carrier 4 is formed by a metal support structure 8, in particular, from a non-ferromagnetic metal. The support structure 8 forms the holder for the sensor 6 and its connecting cable 10.

The sensor carrier 4 is filled with a potting compound 12 in the interior of the support structure 8, whereby the sensor device 2 achieves the necessary mechanical stability. In addition, a plurality of stabilizers 14 is installed in the sensor carrier 4 in order to increase stability.

The surface, in particular the lateral surface, of the sensor carrier 4 is formed by a plurality of interrupted, metal surface areas of the support structure 8 and by areas filled with the potting compound 12.

The sensor carrier 4 is closed at the bottom by a plastic head 16, out of which an electrical connecting cable 17 is routed out of the sensor device 2.

Figure 2:
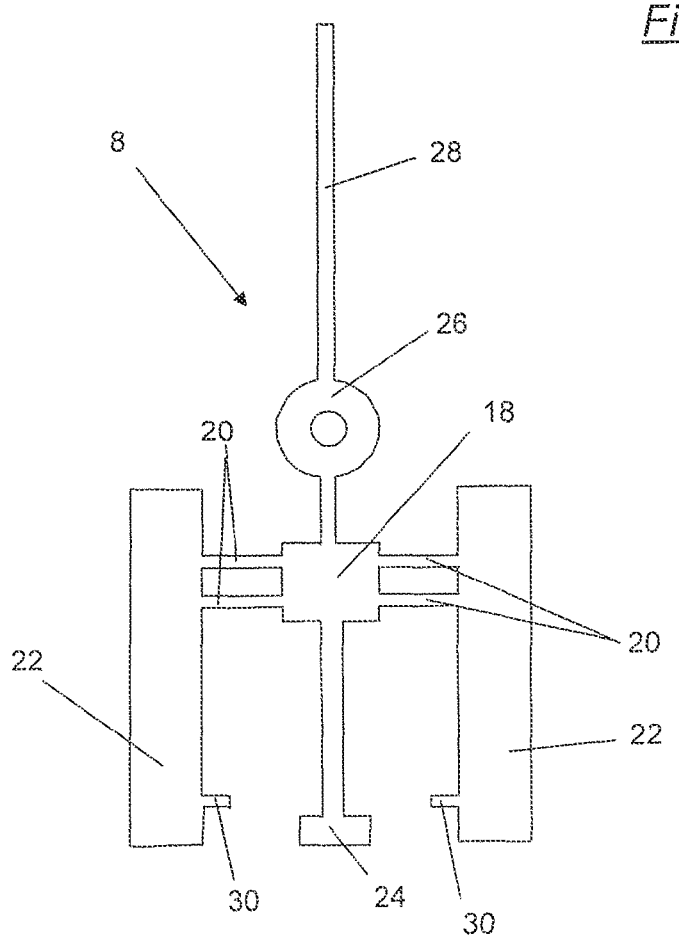
FIG. 2 is a schematic illustration of a support structure as a stamped and bent part in accordance with an exemplary embodiment of the present invention.

FIG. 2 is a schematic illustration of an embodiment of the support structure 8 as a stamped and bent part before the bending process. It should be noted that this is not a full-scale depiction of the support structure 8.

A sensor supporting surface 18 for the attachment of the sensor 6 is located in the center. The sensor supporting surface 18 is connected to a contact surface 22 on both sides by two connecting webs 20 in each case.

The configuration of the contact surface 22 is designed according to the configuration of the clamping bush to be used for installation.

Figure 3:
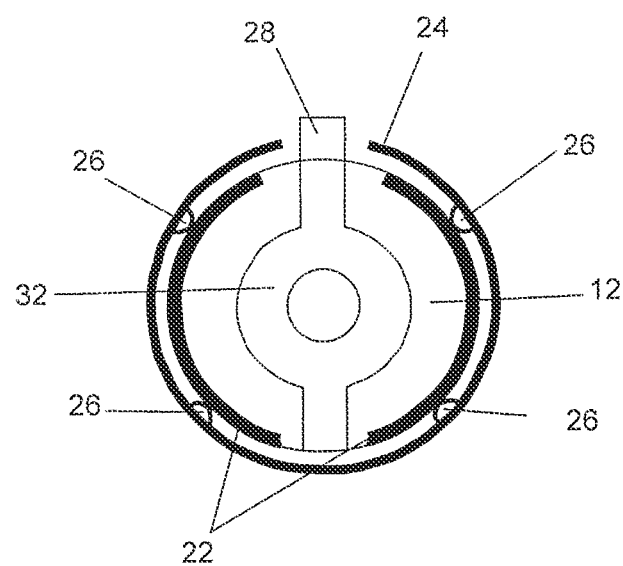
FIG. 3 is a schematic illustration of the front face of a sensor arrangement according to an exemplary embodiment of the present invention.

FIG. 3 is a schematic illustration of the front face of a sensor arrangement comprising a sensor device 2 introduced into a clamping bush 24. Such clamping bushes 24 usually comprise a plurality of clamping elements 26, in particular resilient tongues, in order to achieve a sufficient retaining force with respect to the sensor device 2. The contact surfaces 22 are dimensioned such that, in the stalled state, sufficiently resilient tongues 26 rest against the contact surfaces 22 in order to clamp the sensor device 2 in the clamping bush 24. The support structure 8, as illustrated in FIG. 2, can comprise two, three or four a contact surfaces 22.

In order to ensure that the contact surfaces 22 are positioned precisely on the clamping elements 26, the sensor device 2 comprises a guide projection 28, which is guided into a slot in the clamping bush 24 as the sensor device 2 is inserted into the clamping bush 24.

Furthermore, the sensor supporting surface 18 according to FIG. 2 is connected to the attachment surface 30 via a web. The connecting cable 10 of the sensor 6 is attached on the attachment surface 30. The attachment is preferably carried out cost-effectively by means of a crimping process in which the sides of the attachment surface 30 are bent upward over the connecting cable 10.

A front cover surface 32 is located above the sensor supporting surface 18. The front cover surface, in the bent state, forms the front face of the sensor device 2 and, in the installed state, is directed toward the rotor. The hole within the front cover surface 32, which is shown in FIG. 2 and FIG. 3, advantageously functions as an installation aid and simplifies tool positioning during production and installation.

The extension above the front cover surface 32, in the bent state, forms the guide projection 28 for the oriented insertion of the sensor device 2 into the clamping bush 24. To this end, the guide projection 28 extends beyond the longitudinal side of the sensor carrier 4 and has a slight bend, preferably in the front third of the sensor carrier 4.

The guide projection 28 ensures that the resilient tongues 26 of the clamping bush 24 rest against the contact surfaces 22 and not therebetween on the potting compound 12. Specifically, contact between metal and metal advantageously ensures a long-lasting hold, whereas contact of the resilient tongues with the plastic of the potting compound 12 would yield over time.

Finally, the support structure 8 has potential attachment tabs 33 on the contact surfaces 22. The attachment tabs 33 can be bent and arranged in any way and serve to improve handling when filling the sensor carrier 4 with the potting compound 12.

Figure 4:
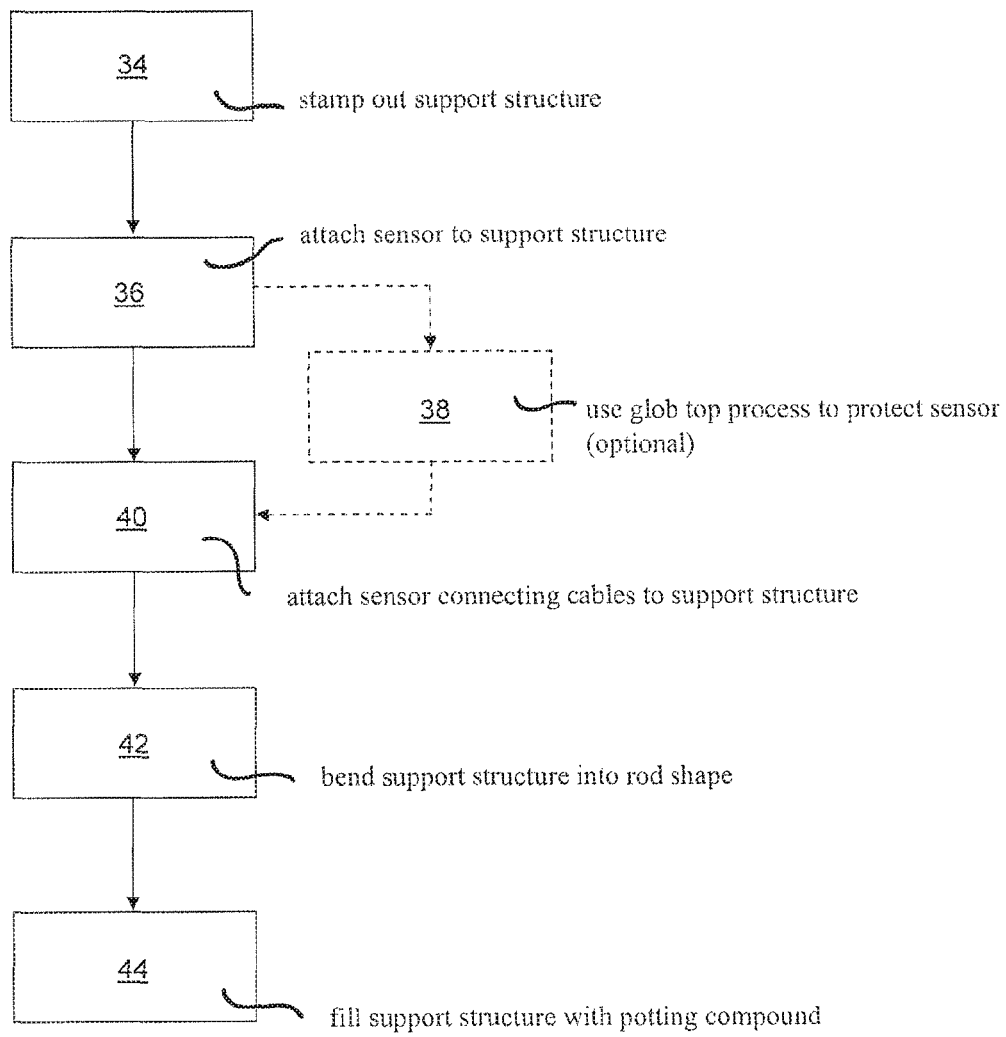
FIG. 4 is a block diagram illustrating a method for producing a sensor device according to an exemplary embodiment of the present invention.

FIG. 4 is a block diagram illustrating a method according to the present invention for producing a sensor device 2.

In a first step 34, the support structure 8 is initially stamped out of a metal sheet. The metal sheet is preferably a non-ferromagnetic metal. Single-layer stamped screens can be created by stamping and bending machines. The stamped screens acquire a three-dimensional structure by the bending.

In a next step 36, the sensor 6 is attached on the sensor supporting surface 18 of the support structure 8 by an adhesive. The connecting cables 10 are preferably attached on the sensor 6, for example by soldering or welding, before the sensor 6 is attached on the sensor supporting surface 18.

Optionally, a glob top process 38 is used to protect the sensor 6 with respect to the surroundings. To this end, a thick drop of a viscous potting compound, in particular silicone, is dropped onto the sensor 6 or the sensor circuit. The drop runs until the entire sensor supporting surface 18, including the sensor 6, is covered.

Next, in a step 40, the connecting cable(s) 10 of the sensor 6 are attached on the attachment surface 30 of the support structure 8. The attachment surface 30 itself functions as the base for the connection in that the sides of the attachment surface 30 are bent around the connecting able 10. The joining or crimping process provides a connection that is difficult to disconnect and ensures high mechanical safety.

The method offers the advantage that the sensor 6 and the connecting cables 10 can be attached on the support structure 8 rapidly, easily, and precisely, since the support structure 8 is still flat at the time of attachment.

Once the sensor 6 and the connecting cables 10 are fixedly connected to the support structure 8, the support structure 8 is bent in a bending step 42. The bent support structure 8 provides the sensor device 2 with the shape of a rod, wherein the dimensions of the sensor device 2 are predefined by the clamping bush 24 to be used.

The bent support structure 8 forms a substantially rod-shaped or circular-cylindrical cage structure given that the surface of the support structure 8 is not closed. The open areas of the surface ensure better temperature properties of the sensor device 2.

Finally, in a step 44, the support structure 8 is filled with the potting compound 12. The liquid potting compound 12 is poured into the support structure 8, wherein the support structure 8 is situated in a suitable mold, or wherein the interrupted surface areas thereof are sealed for the casting process, thereby ensuring that the potting compound 12 cannot escape through the openings.

For the case in which areas that form the stabilizers 14 were not taken into consideration when the support structure 8 was stamped, at least two stabilizers 14 are introduced into the sensor carrier 4 before filling with the potting compound 12, in order to ensure a constant separation between the contact surfaces 22.

To install the sensor device 2, the clamping bush 24 is slid, in any orientation relative to the longitudinal axis, into the retaining opening provided for this. Next, the sensor device 2 is inserted into the clamping bush 24. The plurality of clamping elements 26 apply a clamping force onto the sensor device 2 and thereby hold this sensor device in the retaining opening.

The guide projection 8 of the sensor device 2 predefines the direction as the sensor device 2 is slid into the clamping, bush 24 since the guide projection 28 extends within a slot in the clamping bush 24. The guide projection 28 ensures that the clamping elements 26 of the clamping bush 24 rest against the contact surfaces 22 of the sensor device 2.

The sensor device 2 can therefore be produced at low cost and is functionally reliable even in the event of severe temperature fluctuations. The cage structure having the open surface areas advantageously ensures fixed seating of the contact surfaces in the clamping bush 24 even if the plastic of the potting compound 12 were to shrink slightly.

Furthermore, the sensor device 2 delivers precise measured values if the plastic or the potting compound 12 were to unintentionally oscillate, since the sensor 6 is fixedly attached on the support structure 8.

It wilt thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A sensor device for detecting a wheel speed of a vehicle, the sensor device comprising:
   a rod-shaped sensor carrier; and
   a sensor insertable into the sensor carrier, the sensor configured to sense rotation of a rotor rotating with a wheel of the vehicle;
   the rod-shaped sensor carrier including a metal support structure configured to accommodate the sensor, a potting compound filling the sensor carrier within the support structure, a lateral surface including a plurality of metal surface areas of the support structure that are spaced apart from each other and to define open areas filled with the potting compound, and at least two metal contact surfaces forming exterior sidewalls of the rod-shaped sensor carrier and being oppositely disposed to enclose a portion of the potting compound and the sensor therebetween, and
   at least two stabilizers disposed transversely to a longitudinal axis of the sensor carrier and interconnecting the at least two metal contact surfaces.

2. The sensor device as claimed in claim 1, wherein the support structure includes a guide projection for facilitating oriented insertion of the sensor device into an available clamping bush.

3. The sensor device as claimed in claim 1, wherein the support structure is formed from a carrier strip as a stamped and bent part.

4. The sensor device as claimed in claim 1, further comprising a sensor supporting surface within the support structure for attaching the sensor.

5. The sensor device as claimed in claim 1, further comprising a front cover surface of the support structure.

6. The sensor device as claimed in claim 1, further comprising an attachment surface within the support structure for attaching at least one connecting cable of the sensor.

7. The sensor device as claimed in claim 1, further comprising at least one attachment tab on at least one of the at least two metal contact surfaces.

8. The sensor device as claimed in claim 1, wherein the sensor is one of an active sensor and a passive sensor.

9. The sensor device as claimed in claim 1, wherein the sensor device is clamped into a clamping bush, the clamping bush having clamping elements that abut the at least two metal contact surfaces of the sensor device.

10. The sensor device as claimed in claim 9, wherein the sensor device forms part of the vehicle.

11. The sensor device as claimed in claim 1, wherein the sensor device forms part of a wheel speed detection system for a vehicle driver assistance system, the wheel speed detection system comprising the sensor device and a control unit, the control unit being configured to process signals or data from the sensor device for at least one of open-loop control functions and closed-loop control functions.

12. The sensor device as claimed in claim 11, wherein the sensor device forms part of the vehicle.

13. The sensor device as claimed in claim 1, wherein the sensor device forms part of the vehicle.

\* \* \* \* \*